(12) United States Patent
Proano

(10) Patent No.: US 12,192,210 B2
(45) Date of Patent: Jan. 7, 2025

(54) IDENTITY ANONYMIZATION WITH CONTROLLED MASKING AND FORMAT PRESERVING ENCRYPTION

(71) Applicant: MICROSOFT TECHNOLOGY LICENSING, LLC, Redmond, WA (US)

(72) Inventor: Guillermo Paul Proano, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 17/966,490

(22) Filed: Oct. 14, 2022

(65) Prior Publication Data

US 2024/0129316 A1   Apr. 18, 2024

(51) Int. Cl.
*H04L 9/40* (2022.01)

(52) U.S. Cl.
CPC ........ *H04L 63/102* (2013.01); *H04L 63/0428* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,970,143 | B2 * | 6/2011 | Vennelakanti | G06F 21/602 380/277 |
| 9,183,158 | B2 * | 11/2015 | O'Loughlin | H04L 9/3066 |
| 9,425,958 | B2 * | 8/2016 | Vennelakanti | H04W 12/069 |
| 10,057,217 | B2 * | 8/2018 | Lock | H04L 63/0428 |
| 10,951,392 | B2 | 3/2021 | Pivovarov | |
| 11,222,554 | B2 | 1/2022 | Balabine et al. | |
| 11,418,326 | B2 * | 8/2022 | Patel | H04L 9/0822 |
| 11,552,802 | B2 * | 1/2023 | Bansal | H04L 67/02 |
| 11,966,498 | B2 * | 4/2024 | Babu | G06F 21/6227 |

(Continued)

FOREIGN PATENT DOCUMENTS

CN    113037488 A    6/2021

OTHER PUBLICATIONS

"Presidio Anonymizer", Retrieved From: https://microsoft.github.io/presidio/anonymizer/, Retrieved Date: Jul. 28, 2022, 8 Pages.

(Continued)

*Primary Examiner* — Backhean Tiv
(74) *Attorney, Agent, or Firm* — Workman Nydegger

(57) ABSTRACT

Systems are methods are used for facilitating identify anonymization by using controlled masking and encryption of user identifiers, such as UUIDs. A system that manages a UUID converts the UUID into a set of one or more different unique versions of the UUID for one or more corresponding different partner system(s) by removing and replacing masked portions of the UUID and by selectively encrypting the non-masked portions of the UUID. New masked portions added to the new version(s) of the UUID identify different corresponding partner(s) and/or rules to be applied by the different partner(s) when handling the different unique version(s) of the UUID(s). Partner systems that receive the new versions of the UUID identify and utilize the new masked portions to deterministically control decrypting and/or other processing of the new version of the UUID.

15 Claims, 7 Drawing Sheets

(56) References Cited

U.S. PATENT DOCUMENTS

| | | | |
|---|---|---|---|
| 2008/0293411 A1* | 11/2008 | Hinton | H04L 63/0407 |
| | | | 455/435.1 |
| 2009/0282468 A1* | 11/2009 | Banga | H04L 67/02 |
| | | | 726/8 |
| 2017/0104726 A1 | 4/2017 | Camenisch | |
| 2020/0262391 A1* | 8/2020 | Pham | H04L 9/3273 |
| 2021/0021423 A1* | 1/2021 | Latorre | G06Q 10/10 |
| 2021/0029091 A1* | 1/2021 | Ou | H04L 9/0631 |
| 2021/0211867 A1 | 7/2021 | Amorde et al. | |
| 2024/0070303 A1* | 2/2024 | Lovmand | G06F 21/6209 |
| 2024/0129316 A1* | 4/2024 | Proano | H04L 63/0428 |

OTHER PUBLICATIONS

"Presidio Anonymizer API Reference", Retrieved From: https://microsoft.github.io/presidio/api/anonymizer_python/, Retrieved Date: Jul. 28, 2022, 65 Pages.

Chen, Lily, "Recommendation for Key Derivation Using Pseudorandom Functions", Retrieved From: https://csrc.nist.gov/publications/detail/sp/800-108/archive/2008-11-06, Nov. 2008, 21 Pages.

Dworkin, Morris, "Recommendation for Block Cipher Modes of Operation: Methods for Format-Preserving Encryption", Retrieved From: https://csrc.nist.gov/publications/detail/sp/800-38g/final, Mar. 2016, 28 Pages.

International Search Report and Written Opinion received for PCT Application No. PCT/US2023/032809, mailed on Dec. 7, 2023, 13 Pages.

* cited by examiner

IDENTITY ANONYMIZATION WITH CONTROLLED MASKING AND FORMAT PRESERVING ENCRYPTION

BACKGROUND

Background and Relevant Art

Unique user identifiers (UIDs), including universally unique user Identifiers (UUIDs) and globally unique identifiers (GUIDs), are commonly used to identify and associate different users and user devices with corresponding rights, privileges and controls for accessing various provider resources and services.

GUIDs/UUIDs are typically formatted as a unique sequence of digits that can beneficially obfuscate personal identifying information about a corresponding user. Accordingly, a GUID/UUID can be used when performing a transaction with different providers and third-party services, based on the relevant rights, privileges and controls associated with the identifier, and without necessarily requiring a user to provide their name and other confidential account for each transaction.

There is currently an ongoing need and desire to provide new and improved techniques for managing UUIDs, and particularly in a manner that can help facilitate improvements in anonymization and privacy of user accounts.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments can be used to facilitate the anonymization of user identities by using controlled masking and encryption of the user's corresponding user identifiers, such as UUIDs.

Disclosed embodiments include systems that are configured to identify or generate UUIDs, as well as to convert UUIDs into sets of one or more different unique versions of the UUIDs, for one or more corresponding different partner system(s). The systems generate modified versions of an underlying base UUID by removing and replacing masked portions of the UUIDs and by selectively encrypting the non-masked portions of the UUIDs.

New masked portions are also added to the new version(s) of the UUIDs to identify different corresponding partner(s) and/or rules to be applied by the different partner(s) when handling the different unique version(s) of the UUID(s). Partner systems that receive the new versions of the UUIDs identify and utilize the newly masked portions of the identifiers to deterministically control decrypting and/or other processing of the new versions of the UUIDs. In this manner, the different partner systems are unable to create a correlation to the other unique versions of the UUIDs that have different encrypting and/or masking and that are sent to other partner systems.

In some instances, a UUID managing system creates a new version of a UUID by selectively encrypting only a selected non-masked sub-portion of a UUID, optionally with a format preserving encryption technique, after first identifying and stripping an initial masked portion of the user identifier away from the UUID. Thereafter, subsequent to encrypting the non-masked portion of the UUID, the UUID managing system adds one or more new partner mask(s) and/or one or more control mask(s) to the newly encrypted non-masked portion of the UUID to form a resulting new version of the UUID.

A partner system identifies and uses the new partner/control mask(s) to identify the relevance or correspondence of the new modified UUID to the partner system and/or the rule(s) to be applied for decrypting and/or for otherwise processing and using the modified version of the UUID.

Some disclosed embodiments include generating two or more different new and uniquely modified versions of the UUID for different corresponding partner systems, each associated with a different set of one or more new partner/control mask(s). Different encryptions or transformations can also be used for the non-masked portions of the different versions of the UUID.

When a receiving partner system encounters a new modified version of the UUID, the partner system identifies any masked portion(s) of the new modified UUID and determines how to decrypt/process the non-masked portion(s) of the new modified version of the UUID, based at least in part on the rule(s) associated with the masked portion(s) of the UUID. After the partner system decrypts/processes the non-masked portion(s) of the new modified version of the UUID to generate or re-create the original non-masked portion of the UUID that comprises or identifies the user identity and that may be used for further processing. For instance, the partner system may use the decrypted/processed UUID to obtain user account information to interact with the associated user and/or to control user access to one or more services or resources by the partner system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
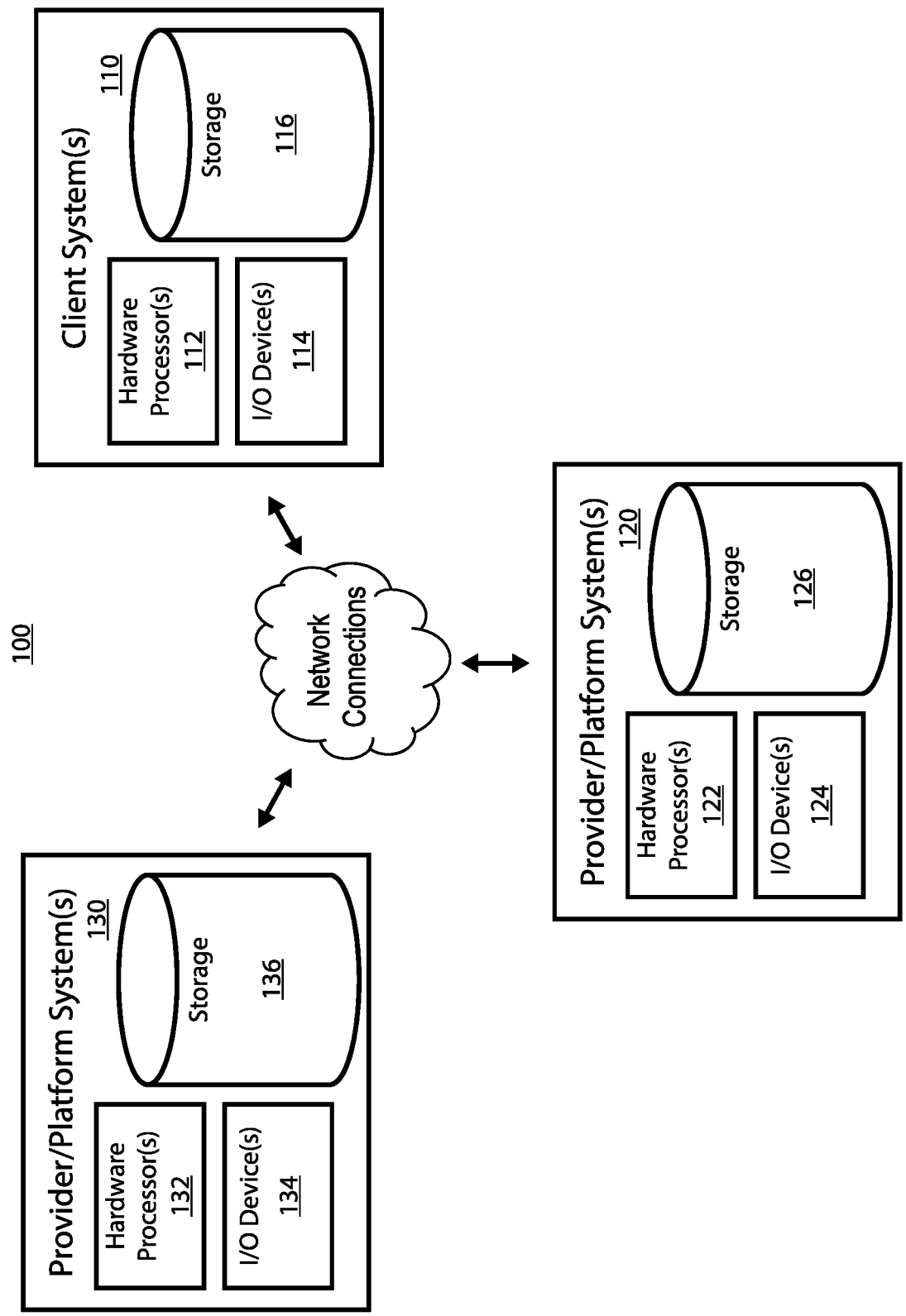
FIG. 1 illustrates an exemplary computing environment that includes different client, server and third-party systems that comprise, incorporate and/or that are used to implement disclosed and claimed aspects of the invention.

Disclosed embodiments can be used to facilitate anonymization of user identities within a shared network of partner systems by using controlled masking and encryption of user identifiers, such as UUIDs or other identifiers, which are provided to the different partner systems to access partner resources and services for the different user identities.

The disclosed embodiments can be used to help address some of the problems that are known in the industry with regard to preserving anonymization and privacy, even when using UUIDs. For instance, even with the general privacy that is afforded by the use of GUIDs/UUIDs, user interactions can still be tracked and correlated in such a way that a user's privacy can be compromised.

By way of example, it is common for large integrated networks or platforms to only use a single UID for each of their subscribers, even though each subscriber may access or interact with a plurality of disparate third-party provider services and resources through a common base network/platform. This is particularly common in the gaming industry. For example, a single UUID is often used by a single user to play multiple different games on a single platform, as well as to purchase different products and services associated with the different games that are being played on the platform.

In such scenarios, when a third-party partner on the network tracks and associates user interactions with the user's platform UUID, which is the same UUID that is also used by different partners in the same provider network to track similar or unrelated user interactions, it is sometimes possible for correlations to be made by the different partners about the users based on their UUIDs. For instance, it is possible for the different network entities to at least infer, if not explicitly discover, preferences, habits, activities and other personally identifiable information about a single user, based on the use of the same discoverable UUID on a shared partner network. This type of privacy risk is typically not known or desired by the user and is particularly problematic for systems that are trying to be GDPR compliant.

To mitigate the correlation of user information by third party providers, based on the use of a single UUID across the different partner systems, it is theoretically possible for each network platform to create multiple different UUIDs for each user, including a different UUID for each of the user's devices, as well as for each different service and resource that may be accessed the on the provider network, or at least for each different third-party partner.

However, such a proliferation of UUIDs would be prohibitively expensive, particularly for large integrated networks that have millions of different users, and particularly when considering that each user may have multiple different devices that are each capable of interacting with tens to hundreds of different partners, services and products on the provider network. The storage and processing requirements to index and manage such a large number of UUIDs would also result in a significant degradation of the platform's database performance and overall consumer experience.

To help address some of these problems, the disclosed embodiments provide ways to further increase anonymization of the user identity by selectively masking and encrypting portions of the base UID.

In some instances, a single UUID is used, for example, to generate multiple different new modified versions of the UUID, each for a different corresponding partner system and each associated with a different set of one or more new partner mask(s) and/or control mask(s).

In this disclosure, the term user identifier (UI), universally unique user identifier (UUID) and globally unique identifier (GUID), are sometimes used interchangeably, and refer to any identifier that is capable of being represented as a string of characters, such as binary or hexadecimal digits, which correspond to an indexed and distinguishable entity, such as a user or user device. There are various types of identifiers that fit this category, including, but not limited to the Microsoft™ Xbox Live XUID, for example.

In some instances, the UUID has a size of 64 bits, such as a typical XUID. In other instances, the UUID is a UUID other than a Microsoft™ Xbox Live XUID. Accordingly, the UUID can also be smaller or larger in size than a typical XUID, such as a UI that is only 32 bits or that is 128 or more bits. Sometimes, the UUID is represented as a string of 16 hexadecimal characters, such as a typical XUID, each consuming 4 bits of space.

The disclosed and claimed UUIDs beneficially include both a masked portion, as well as an unmasked portion. The masked portion contains one or more mask(s) that generally identify the intended or assigned destination(s) and purpose(s) of the UUID. The characters represented by the mask(s) are part of the UUID, by are distinguished from the actual user identity information contained in the non-masked portion. Each mask in the masked portion identifies a type, criteria, and/or rule associated with the handling and processing of remaining contents of the user identity information contained in the unmasked portion of the UUID. Each mask is also associated with different encrypting/transformation processes for obfuscating the underlying user identity information in the non-masked portion. In this manner, different versions of the UUID having different masks, are able to increase the anonymization of the user identity associated with the different versions of the UUID, as will be described in more detail below.

Attention is now directed to FIG. 1, which illustrates an exemplary computing environment 100 that includes different client (110), server (120) and third-party (130) systems that comprise, incorporate and/or that may be used to implement disclosed and claimed aspects of the invention.

The client system 110 includes one or more hardware processor(s) 112, and various input/output (I/O) devices 114 for interfacing with users and other computing systems. Components used to receive user input (e.g., keyboards, mouse devices, touch pads/screens, motion sensors and cameras, etc.) are well-known in the industry, as are corresponding output devices (e.g., speakers, displays, haptic feedback devices, etc.).

The storage 116 includes a combination of volatile and/or non-volatile storage that stores computer-executable instructions that are executed by the hardware processor(s) to implement the functionality of the disclosed and claimed invention. The storage 116, for example, stores modules configured to identify, access, generate and modify UUIDs in the manner described herein.

The storage 116 is also configured to store the referenced UUIDs, including the modified versions of the UUIDs, as well as indices, tables and other storage structures used to associate different UUIDs with different users/devices (e.g., the client computing system(s) 110 and/or user(s) of the client computing system(s)).

The storage 116 also stores indices, tables and other storage structures (e.g., mask/rule correlation structures) that used to associate different masks or masking identifiers with different provider or partner systems as well as different rules for handling and processing unmasked portions of the UUIDs.

The storage 116 also stores keys, transforms and other elements that are used to encrypt, decrypt and transform the non-masked portions of the UUIDs in the manner described herein.

The client system(s) 110 can be configured as a mobile device, as a stand-alone computer and/or as a distributed computing system.

The computing environment 100 also includes one or more provider/platform system(s) 120 and one or more partner/third-party system(s) 130 that are in communication with each other and/or the client system 110 over one or more network connection(s), including wired and/or wireless connections.

Each of the provider/platform system(s) includes corresponding hardware processor(s) 122, I/O device(s) 124 and storage device(s), which may operate similar to those described above with reference to client system(s) 110. In some instances, the provider/platform system(s) comprises a gaming host system that interfaces with many disparate client system(s) 110 comprising different individual users and devices that are each associated with a different UUID and corresponding rights, privileges and controls for accessing and using games hosted by the gaming host system.

Each of the partner/third-party system(s) 130 also includes corresponding hardware processor(s) 122, I/O device(s) 124 and storage device(s), which may operate similar to those described above with reference to client system(s) 110. In some instances, the partner/third-party system(s) 130 comprises a gaming service or third-party service that provides different services and products to the disparate client system(s) 110 through the gaming sessions hosted by the gaming host system (120) and/or that can be separately procured by direct connections with the client system(s) 110 outside of gaming sessions hosted by the gaming host system (120).

In some instances, the partner products and services are used to augment functionality of the gaming sessions or attributes of user components utilized in the gaming sessions (e.g., capabilities and resources of a user's gaming characters or avatars). In other instances, the partner products and services are real-world products, such as merchandise. The partner products and services can also be resources used by the gaming host system to perform gaming functionality, such as to facilitate communications between gaming participants and to facilitate tracking and reporting on gaming metrics, for example.

Different security key generating services can also be incorporated into or connected to the partner/third-party system(s) 130 for generating keys that are used by the client and provider systems for encrypting and decrypting selected portions of the UUIDs, as described herein.

In some instances, when a user registers or subscribes for products and services with either of the provider/platform system(s) or affiliated partner/third-party systems 130, a user identifier is generated by the provider system to associate that user with the rights, privileges and controls for their registered resources. In many cases, a single UUID is generated by a provider system and used by both the provider as well as all affiliated partner systems in the distributed provider network to associate a user with a particular user identity or account specified by the UUID.

In many embodiments, the user identifier is generated with a first masked portion that identifies a partner or provider identifier type, even more specifically, a type of provider or partner service/resource (e.g., a user account) that the identifier corresponds to. The identifier will also include an unmasked portion that uniquely identifies and distinguishes the registered user or user device from other users/devices that are also registered or subscribed with the provider or partner system(s) for similar or dissimilar resources.

The use of the UUID provides some identity anonymization to users in the distributed network. However, as previously mentioned, this anonymization can be thwarted by correlations that can be made by the different systems in the network by tracking use of the UUID for different transactions in the network.

To help provide enhanced privacy and identity anonymization, the disclosed and claimed embodiments provide improved systems and methods for generating unique variations of the UUID that cannot be easily correlated by the different network partners, and without requiring a completely separate UUID to be generated for each device, system and/or transaction that is used in the network.

Figure 2:
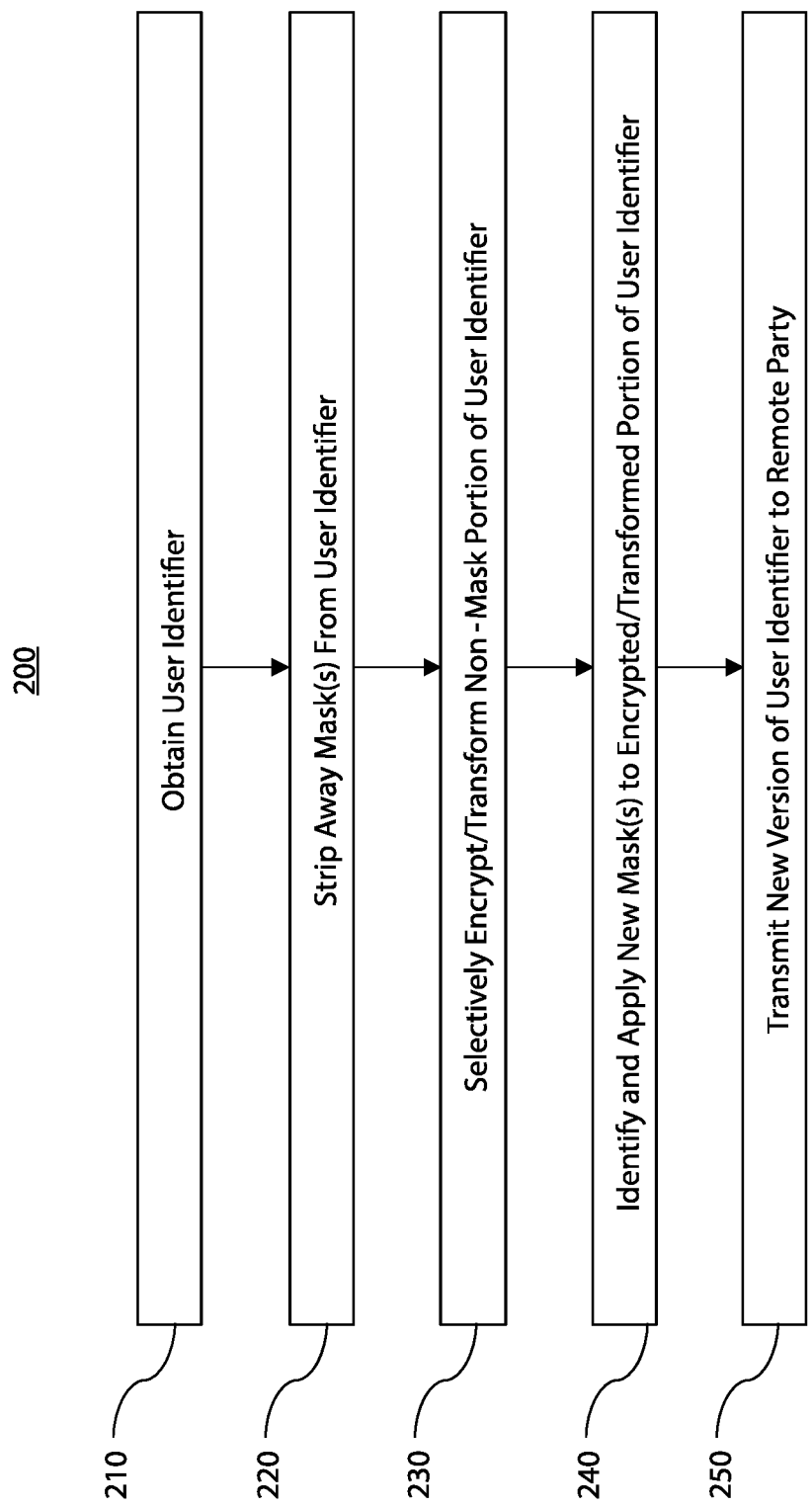
FIG. 2 illustrates a flowchart that includes various acts associated with disclosed and claimed methods for generating and processing modified versions of user identifiers to promote anonymization of user identities associated with the user identifiers.

FIG. 2 illustrates a flowchart 200 that includes various acts associated with disclosed and claimed methods for generating and processing modified versions of user identifiers to promote anonymization of user identities associated with the user identifiers. For instance, a user identity may be associated with a single UUID in a shared network. Then, according to the disclosed method shown in FIG. 2, the UUID may be used to generate a plurality of different modified versions of the UUID that are not easily correlated by the different network entities. This obfuscation of the base UUID can help promote the desired anonymization of the user identity associated with the base UUID.

As shown, the first illustrated act includes a system, such as client system 110 or provider system 120, obtaining a UID corresponding to a user identity (act 210). The UID may be a GUID, UUID, XUID or other type of user identifier that includes a masked portion and a non-masked portion. The unmasked portion of the UID is associated with the user identity in the network, while the masked portion identifies a type of UID. The masked portion may include one or more separate/distinct masks.

The act of obtaining the UID may include generating the UID (e.g., generating a UUID or XUID, for example, when a user registers for an account with the provider system 120). Alternatively, the act of obtaining the UID may include accessing or receiving the UID from a remote system (e.g., a host platform or partner system) that creates the UID when registering a user account associated with the user identity to a corresponding platform or service provided by the remote system.

The next illustrated act includes the isolating of the non-masked portion of the UID by stripping away the mask(s) from the non-masked portion of the UID (act 220).

The system also identifies and selects a set of one or more new masks to be applied to the UID. The selection of the new mask(s) to be applied is an essential act for both the selective encryption/transformation of the non-masked portion of the UID (act 230), as well as the application of the new mask(s) to the encrypted/transformed portion of the UID (act 240), as will be explained in more detail below.

The new masks that are identified for application to the UID are each associated with a corresponding and different set of one or more rule(s) for handling and processing the non-masked portion of the UID. These rules may include, for example, criteria for encrypting/decrypting and transforming the non-masked portion of the UID, as well as restrictions and/or authorizations for user accounts associated with the UID, as well as the identification of partner systems that are associated with the UID, as well as other rules that specify restrictions and controls for handling and processing of the non-masked portions of the UID (e.g., expiration restrictions, limited use restrictions, tasks to perform with the UID, communication protocols, event triggers, etc.).

In some instances, each different mask corresponds to a different set of one or more rules, such that a first mask may correspond to and identify a first partner system assigned to handle the UID and a different mask corresponds to and identifies a second partner system assigned to handle the UID. Likewise, a first mask may identify a first authorization or restriction for a user account and a different mask may identify a different authorization or restriction for the user account. It will also be appreciated that, in some instances, a first mask may apply to only a single rule, while a different mask may apply to a plurality of rules.

The masks and the rules associated with each of the masks is stored in one or more tables, indices, or other mask/rule correlation data structures by the same system that generates the different versions of the UID. Each of the partner systems that process the modified versions of the UID may also store or have access to a portion or the entirety of the same or different mask/rule correlation data structures. The sharing of the mask/rule correlation data structures may be a result of the provider system generating the correlation data structures and either sending portions of the correlation data structures to requesting entities and/or by providing access to the correlation data structures.

In some instances, a partner system does not store and is not provided access to portions of the mask/rule correlation data structures that do not include mask and rule pairings that are not associated with that partner system, but which correspond to different partner systems. In this manner, one partner system is prevented from being able to infer how to handle and decrypt non-masked portions of a UID based on inadvertently or intentionally accessing the UID and deriving handling/processing rules from the masks of the UID that do not correspond to that partner.

In other instances, a first partner system may access the masks and rules corresponding to a different partner system but will still be unable to decrypt and utilize the non-masked portion of the UID, even when the mask specifies general rules for decrypting the non-masked portion of the UID, such as when that specified mask rule requires the application of a decryption key that first partner system does not have access to, but which the different partner system does have access to. Even in this scenario, however, it will be appreciated that it is still possible to provide enhanced anonymity of the user identity utilized by different partner systems and without having to generate different UIDs for the user identity.

Subsequent to stripping away the masked portion of the UID, the system selectively generates a modified non-masked portion of the UID by modifying the non-masked portion of the UID with a particular modification process while refraining from applying the particular modification process to the masked portion of the UID (act 230).

This modification process may include, for instance, encrypting the non-masked portion of the UID with an encryption key known by a partner system associated with the mask. In some instances, the encryption is a format preserving encryption. For instance, when the UID is a 64-bit XUID, and a 16-bit mask is removed from the XUID, the 48 bits of the non-masked portion of the XUID can be encoded as a string of six bytes and encrypted with a Radix of 256. In other embodiments, other sized UIDs (e.g., 128-bit GUID) and different x-bit encryption processes (e.g., 128-bit or another x-bit encryption) can also be used.

With regard to encryption/decryption rules associated with the different masks, it will be appreciated that a mask can be associated with any type of encryption rules that are used to modify the non-masked portion of the UID, as well as with the corresponding decryption rules. The rules for encrypting/decrypting the non-masked portion of the UID may be unique for a particular mask or, alternatively, may be shared between two or more different masks.

The modification of the non-masked portion may also be based on mask rules that specify transforms to be applied to the non-masked portion of the UID. For instance, the rules may specify how to apply a transform to the string of characters included in the non-modified portion of the UID that changes formatting to the string of characters that form that portion UID content, but that does not necessarily encrypt the content, and which may occur prior to or subsequent to the encrypting of the transformed content.

The transformation may also include adding, removing, or substituting content included in the non-masked portion of the UID, prior to or subsequent to the encrypting.

Then, subsequent to generating the modified non-masked portion of the UID (act 230), the system composes a new version of the UID by adding the set of one or more newly identified masks to the modified non-masked portion of the UID (act 240). Once generated, the new version of the UID can be transmitted to the remote partner system(s) assigned to handle the UID (act 250).

Notably, the system may iterate the foregoing acts to generate a plurality of different new versions of the UID that each correspond to different partner systems and that each include a different combination of one or more mask(s), with different corresponding rules, and/or differently transformed modifications of the non-masked portion of the UID. Notably, the different versions of the UID are not able to be used for generating privacy invading correlations based on the use of the different versions of the UIDs by the different partner systems in the shared network.

It is also noted that the foregoing embodiments described the stripping of a mask from the UID prior to applying the new masks. However, in some alternative embodiments, the UID does not originally include a masked portion until the system applies/attaches a mask to the UID, such as during modification of a base UID that does not originally have a mask applied. In such instances, the system may apply the new mask to generate a new UID that is processed according to the flow shown in FIG. 2. Or, alternatively, the system may simply add the new mask(s) while refraining from performing act 220.

Figure 3:
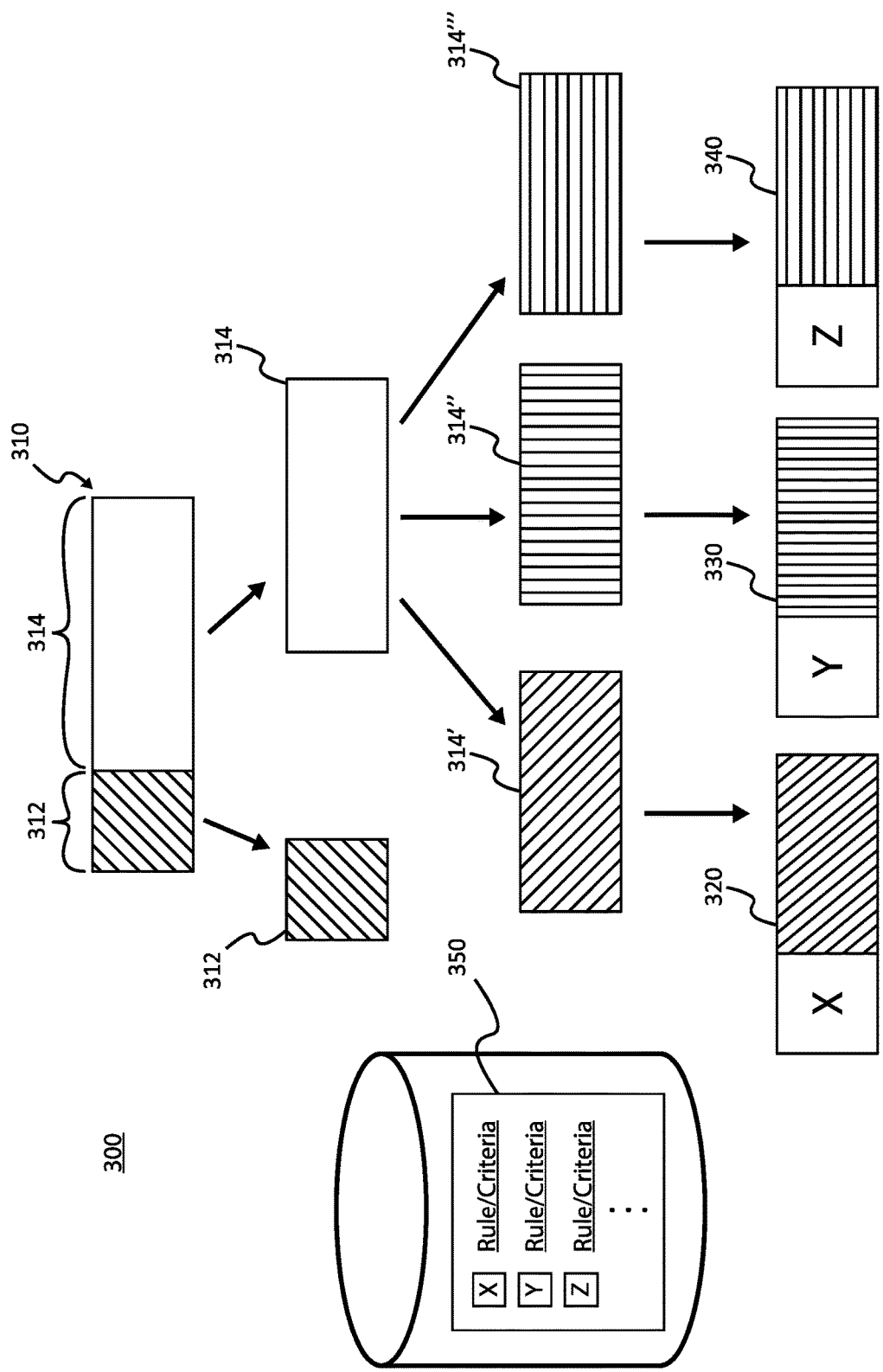
FIG. 3 illustrates an exemplary flow diagram associated with the disclosed techniques for generating and processing modified versions of user identifiers from a base user identifier with different masking being applied to masked portion(s) of the user identifiers and/or by applying different encryptions/transformations to non-masked portion(s) of the user identifiers.

Attention is now directed to FIG. 3, which illustrates an exemplary flow diagram 300 associated with some of the referenced techniques for generating and processing modified versions of user identifiers from a base user identifier with different masking being applied to masked portion(s) of the user identifiers and/or by applying different encryptions/transformations to non-masked portion(s) of the user identifiers.

As shown, an original UUID 310 such as, but not limited, to a 64-bit XUID includes both a masked portion 312 and a non-masked portion 314. The disclosed flow includes identifying and splitting off the masked portion 312 from the non-masked portion 314 and generating one or more modified versions of the original/unmodified non-masked portion 314.

The modified version(s) of the non-masked portion (e.g., 314', 314" and 314''') are generated by encrypting and/or at least transforming the non-masked portion 314 through the application of corresponding encryption techniques and/or transformations that are associated with the new masks to be applied for relevant partner systems. In particular, a rule/masking correlation data structure 350 can be referenced to identify the mask(s) to be applied and the corresponding rules/criteria for encrypting/transforming the non-modified portion 314 of the UUID, based on an intended use(s) and/or destination(s) for the new versions of UUID.

The intended use and/or destination of the UUID, which is considered when deterministically selecting the mask(s) to be applied, may correspond to a request for accessing a service or resource, or for performing a transaction, and/or for routing the UUID to one or more affiliated partner systems. The request may originate from the user associated with the UUID and/or from the affiliated partner system(s).

In the current illustration, the rule/masking correlation data structure 350 includes a plurality of masks (e.g., represented in this illustration as characters X, Y and Z), along with corresponding rules/criteria for handling and processing the UUID and, more specifically, the non-masked portion of the UUID. These rules also identify, in some instances, the partner systems that are assigned to handle and process the UUID according to other rules/criteria associated with each corresponding mask.

After selecting the appropriate mask(s), they are applied/attached to the corresponding modified non-masked portions of the UUID (e.g., 314', 314" and 314'''). This process completes the composition of the new versions of the UUID (320, 330, 340). After composing the new versions of the UUID (320, 330, 340), they can each be sent to the relevant partner systems that are associated with the applied masks.

Figure 4:
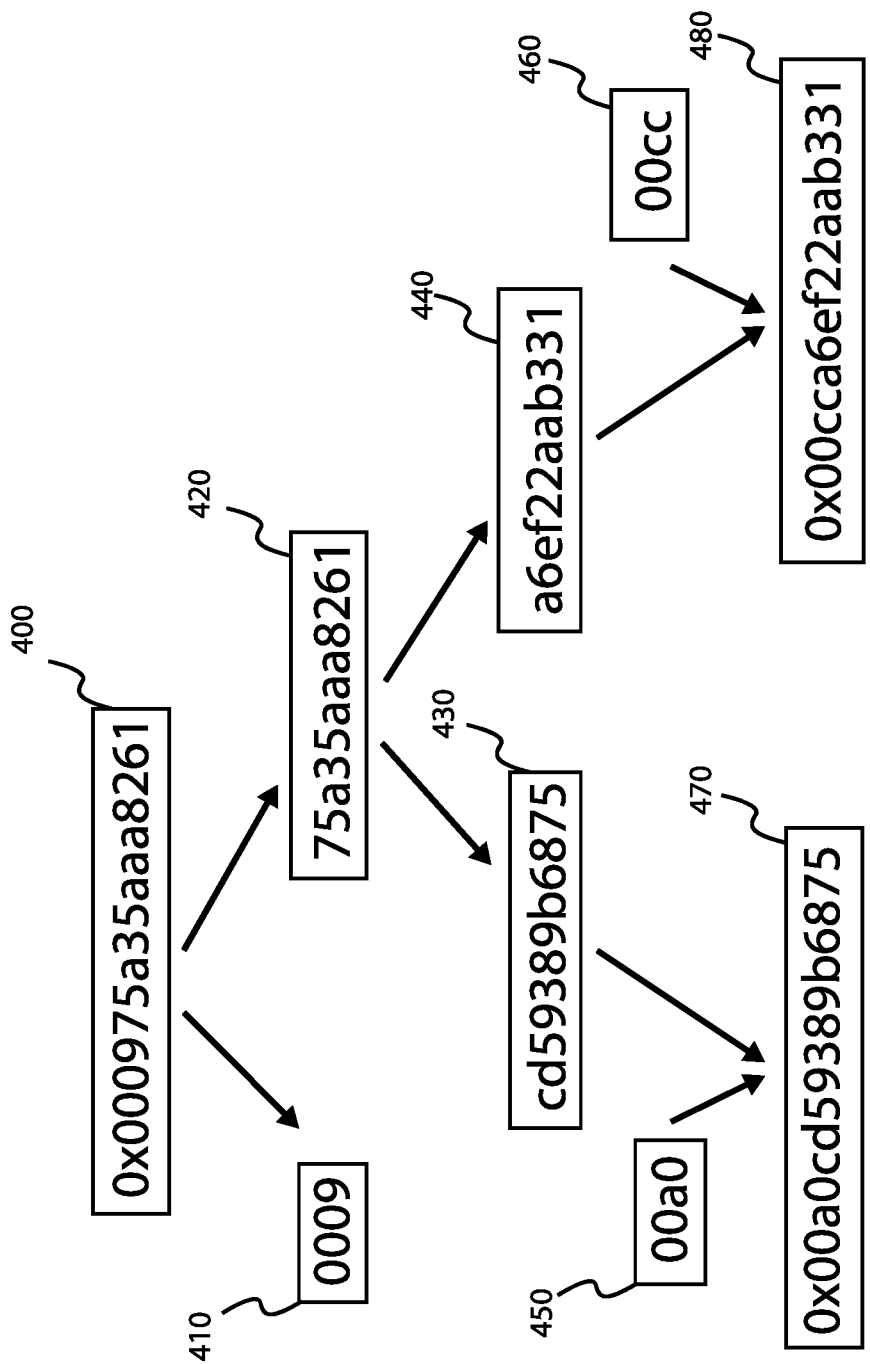
FIG. 4 illustrates a non-limiting example of a UUID being transformed into multiple modified versions of the UUID.

FIG. 4 illustrates another non-limiting example of a UID being transformed into multiple modified versions of the UUID. In this illustration, the UID comprises a 64-bit XUID 400 that is represented as a hexadecimal string of characters. The first 16 bits comprise the masked portion 410 of the XUID and the remaining 48 bits comprise the non-masked portion 420.

After stripping the masked portion 410 away, the non-masked portion 420 is modified into two different modified non-masked portions (430 and 440) according to the current embodiment. Each modified version of the non-masked portion (430 and 440) is formed through the application of different encryption and/or transformation techniques associated with one or more different rules associated with the different masks (e.g., 450 and 460).

After forming the modified version(s) of the non-masked portion of the UID, the flow shows the composition of new versions of the UID (e.g., 470 and 480), each having different masked portions (450 and 460) and different non-masked portions (430 and 440), even though the non-masked portions (430 and 440) are both derived from the same original/base non-masked portion 420.

As previously noted, each of the different masks is also associated with one or more different rules for handling and processing of the UID, specifically, the non-masked portion of the UID, and which may include rules specifying the handling and processing of the non-masked portion of the UID prior to transmission, as well as after transmission, of the resultant unique versions of the UID (e.g., 470 and 480). These rules may also specify, for example, the intended or assigned destinations or uses of the non-masked portions of the resulting unique versions of the UID (e.g., 470 and 480) for consideration when transmitting the new unique versions of the UID (470 and 480).

When an assigned partner system receives the new unique version of the UID that corresponds to that assigned partner system, the partner system determines that the partner system is, indeed, assigned to perform handling and processing of that identifier. This determination can be made, for example, when the partner system references a masking/rule correlation data structure that identifies assignment of the partner system to a mask included in the masked portion of the UUID.

Then, once the partner system determines that it is assigned handling of the UUID, based on the assignment specified in the masking/rule correlation data structure, the partner system applies the corresponding rules (which are also specified in the masking/rule correlation data structure) for decrypting/transforming the non-masked portion of that identifier to recreate the original non-masked portion (420) of the UUID/XUID.

The foregoing examples illustrate the mask of a UID being positioned at the front of the UID. However, in this regard, it will be appreciated that the positioning of the masked portions of the UID may vary to accommodate different needs and preferences, including different system schemas. In particular, a single UID may include any combination of one or more masks that are positioned at the front of the UID, at the end of the UID, as well as at any point between the front and end of the UID.

Figure 5:
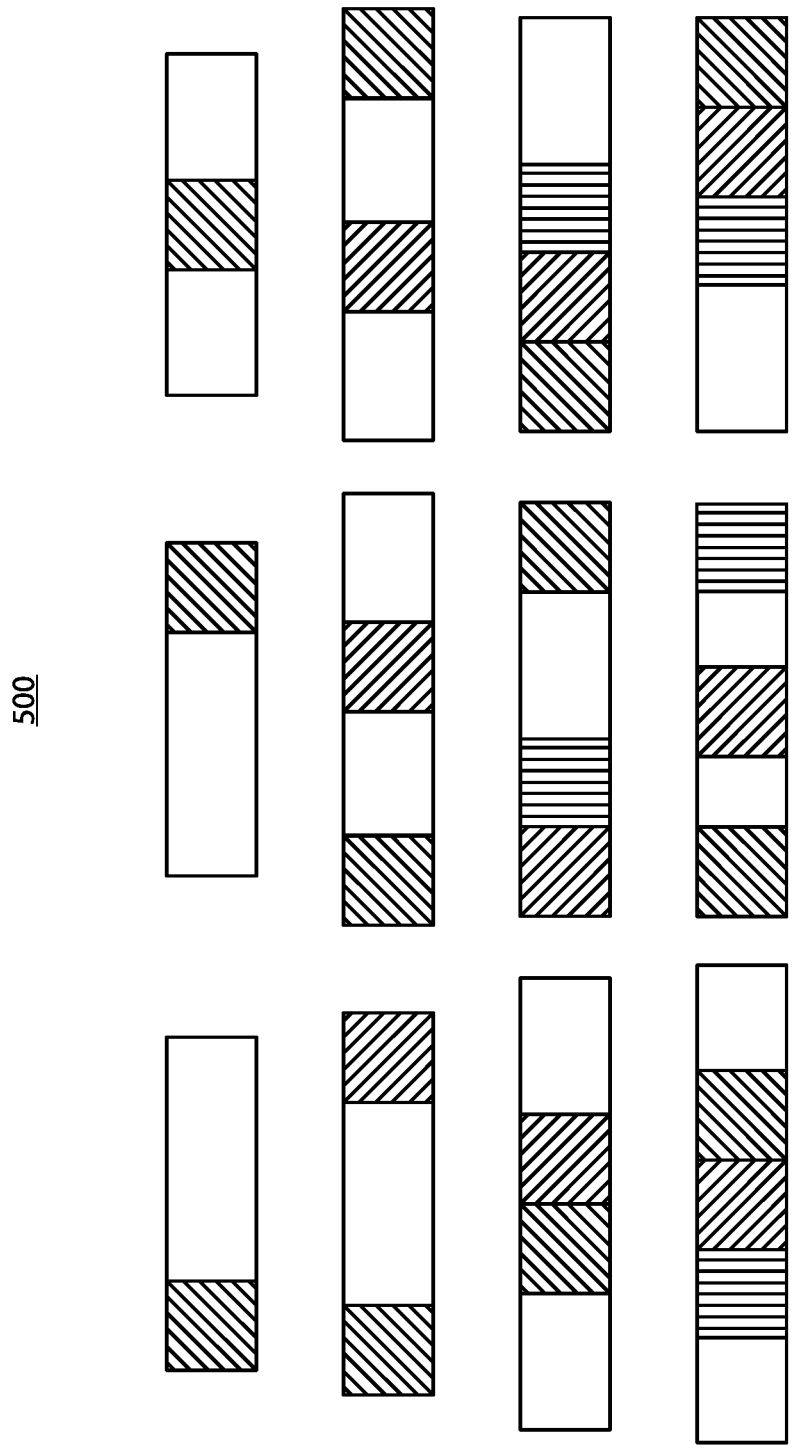
FIG. 5 illustrates non-limiting examples of different arrangements of masking portions and non-masking portions that can be used for different user identifiers.

The potential variations for configuring the masked and non-masked portions of the UIDs extensive. Some non-limiting examples of different UID configurations are illustrated by the visualization 500 of FIG. 5. As shown, different UIDs can include different quantities and positioning of masked portions (shown as shaded segments of the UIDs), along with different quantities and relative positioning of the non-masked portions (shown as unshaded segments of the UIDs).

While the sizes of the masked portions are all shown to be relatively the same, it will also be appreciated that the sizes and content of each of the masked portions may also be modified to accommodate different needs and preferences. For example, in some instances, the non-masked portion is at least two, three or even four times as big as the corresponding masked portion of the same UID (e.g., when only a single mask is used). In other embodiments, the masked portion is at least twice as big as the non-masked portion (e.g., to accommodate the presence of multiple masks). The overall size of the UID can also vary to accommodate different needs and preferences (e.g., a 64-bit UID, a 128-bit UID, a 256-bit UID, etc.).

It will also be appreciated that the syntax and formatting of the different masks can vary to accommodate different needs and preferences, such that one mask intended for handling/processing by a first system is composed in a different syntax or format than a different mask intended for handling/processing by a different system.

Figure 6:
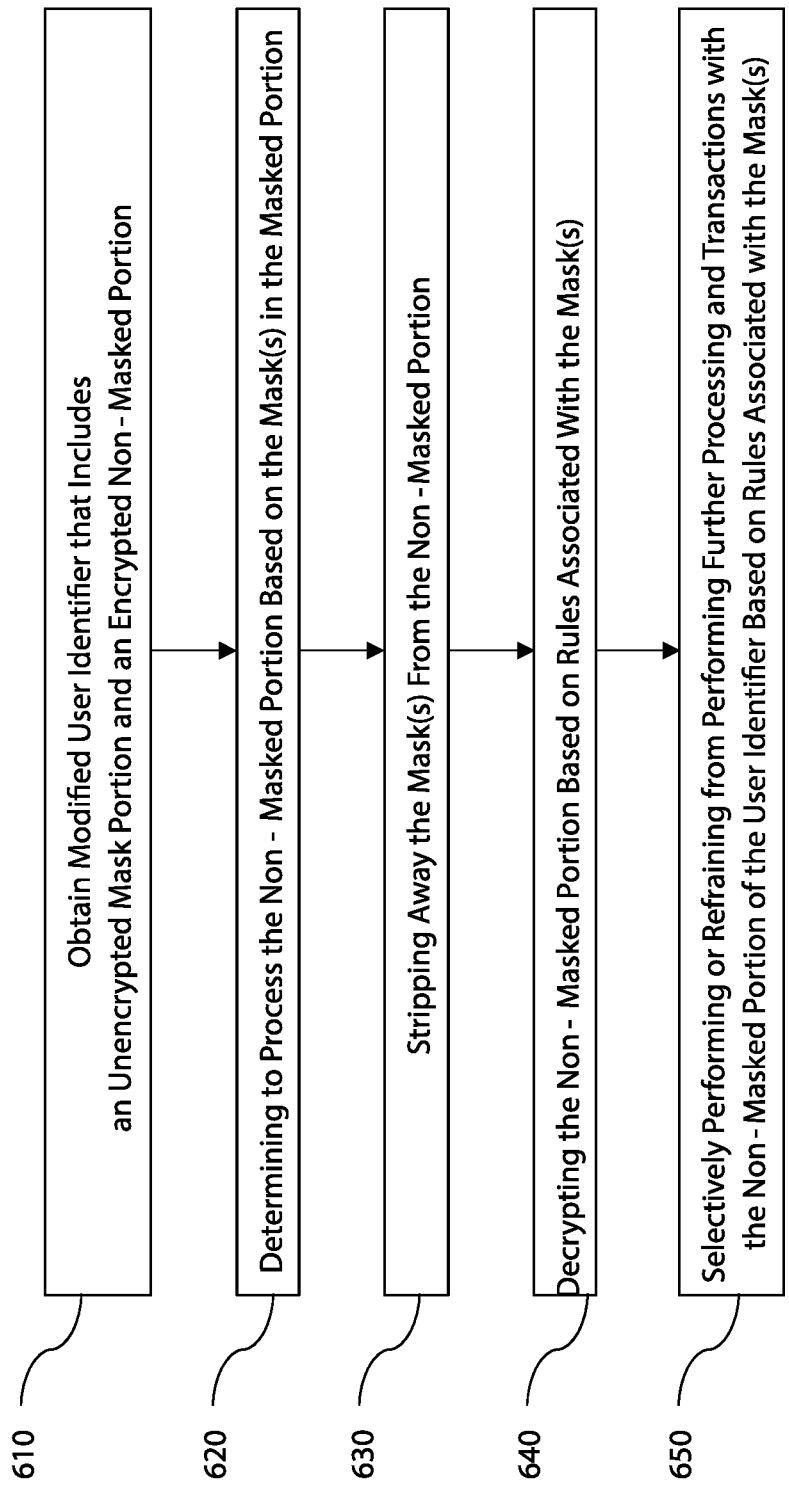
FIG. 6 illustrates a flowchart that includes various acts associated with disclosed and claimed methods for processing modified versions of user identifiers.

Attention will now be directed to FIG. 6, which illustrates a flowchart 600 having various acts associated with disclosed and claimed methods for a system to process the newly modified versions of user identifiers described above.

As shown, the first act includes receiving or otherwise obtaining a modified version of the UID (act 610). This may include, for example, an affiliated partner system receiving a request to grant a user access to certain system resources or services. This request may be received with the modified version of the UID. This modified UID is derived from an original UID corresponding to the user identity and includes both an unencrypted masked portion and an encrypted non-masked portion. The unmasked portion of the UID is specifically associated with the user identity and the masked portion, which includes a set of one or more masks, corresponds with a set of one or more rules for handling and processing the non-masked portion.

Next, the partner system determines, based on the set of one or more masks, whether that partner system should process the non-masked portion the modified version of the UID. In response to a positive determination (act 620), the partner system strips away the set of one or more masks (630) and thereafter decrypts and/or transforms the non-masked portion of the UID (act 640), based on rules associated with the stripped away mask(s), to obtain a copy of the original non-masked portion of the UID that is used to verify/identify the user identity.

Thereafter, the system selectively performs or refrains from performing further processing and transactions with this non-masked portion of the UID, based on the corresponding rules associated with the identifier masking (act 650). This processing may include, for example, verifying/authenticating the user or refraining from verifying/authenticating the user. It may also include granting access or denying access to one or more resources, accessing or denying access to stored user information, performing a financial transaction for the user or refraining from performing a financial transaction for the user. It may also include generating a notification to a user or refraining from generating a notification to the user. The processing may also include identifying and applying additional restrictions associated with the user identity, as well as any combination of the foregoing.

Notably, the UID may also include multiple masks, each having different corresponding rules. For instance, the system may determine that a first mask identifies the partner system is assigned handling and processing of the UID, whereas a second mask may identify specific authorizations or restrictions for a user account associated with the user identity. Other included masks may specify yet other restrictions or authorizations.

In some embodiments, the system may also access a different modified version of the UID and determine to refrain from decrypting the non-masked portion of the different modified version of the UID based on a determination that a masked portion of the modified version of the UID does not include any mask that corresponds to the partner system.

Figure 7:
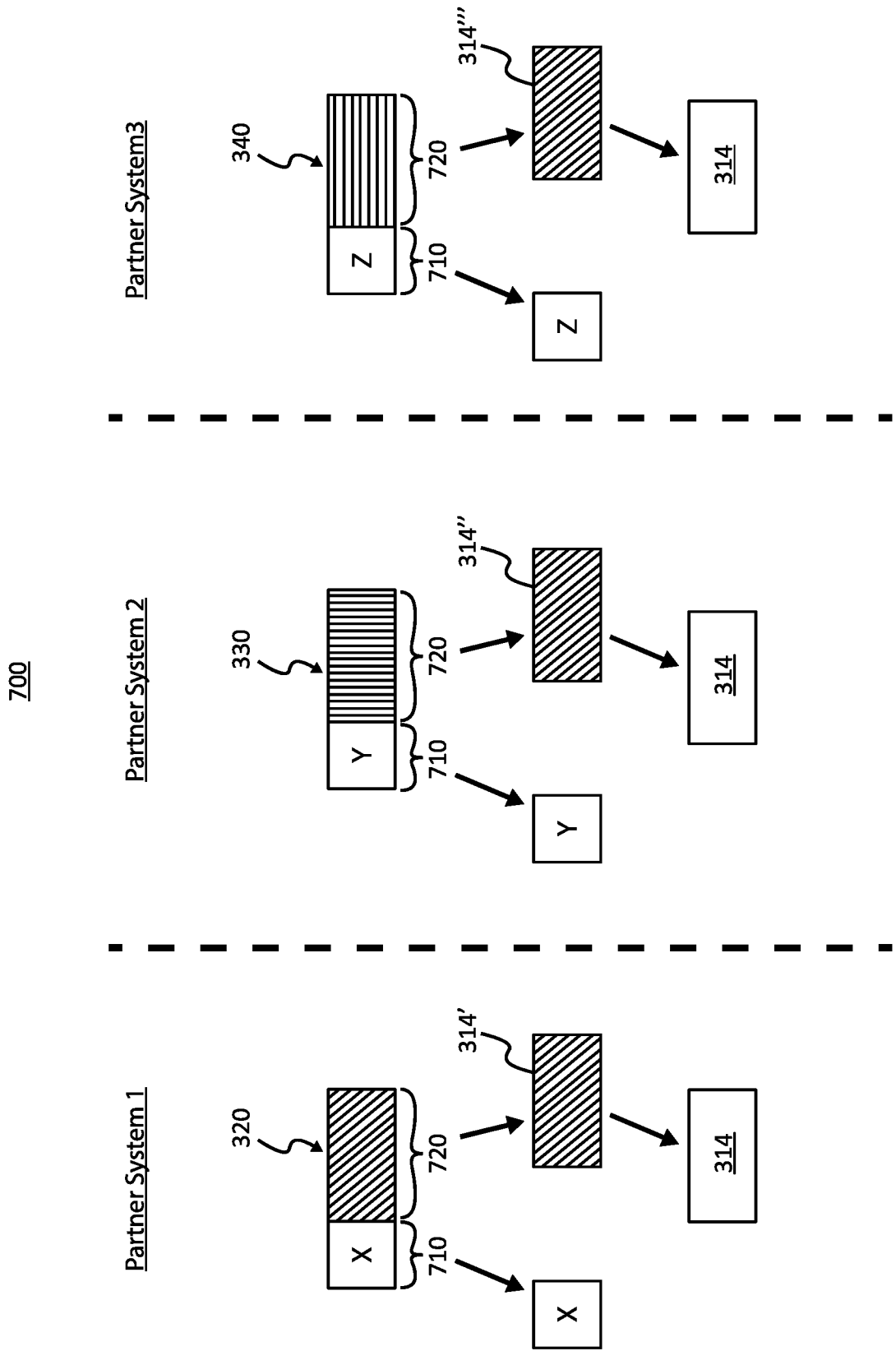
FIG. 7 illustrates an exemplary flow diagram associated with the disclosed techniques for processing modified versions of user identifiers, specifically the non-masked portion(s) of user identifiers based on rules or other criteria associated with masked portion(s) of the user identifiers.

Attention will now be directed to FIG. 7, which illustrates an exemplary flow diagram 700 associated with the disclosed techniques for processing modified versions of user identifiers, specifically the non-masked portion(s) of user identifiers based on rules or other criteria associated with masked portion(s) of the user identifiers.

As shown, three different partner systems 702, 704, 706 receive corresponding and unique versions of a UID (320, 330, 340), all of which are derived from a common base/original UID (e.g., 310 from FIG. 3).

The different partner systems 702, 704, 706 know that they are each assigned to handle/process the received unique versions of the UID based on the corresponding masks that they can identify in the masked portion (710) of UID they received. Notably, the masks in each masked portion (e.g., represented as mask X, mask Y and mask Z) are also associated with specific rules for processing the non-masked portion 720 of the UID.

As previously noted by act 630 of FIG. 6, the systems strip the masks from the non-masked portion 720 of the UID to isolate the different modified versions of the non-masked portions (314', 314", 314'''). The different systems also decrypt/transform the encrypted modified versions of the non-masked portions (314', 314", 314''') with the corresponding decryption keys and transforms specified by the rules for the corresponding masks that were stripped away. The result of this process is the restoration of the original non-masked portion (314) of the original UID. This original/restored identifier is then used to verify/authenticate a user identity and to perform one or more additional processes or transactions authorized for that user identity.

In this manner the user identity can remain relatively anonymous, even when being used by numerous disparate systems in a shared network.

It will be appreciated that the foregoing methods may be practiced by a computer system, as previously described, which includes one or more processors and computer-readable media such as computer memory. In particular, the computer memory may store computer-executable instructions that when executed by one or more processors cause various functions to be performed, such as the acts recited in the embodiments.

Embodiments of the present invention may incorporate or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can include at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) use transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are shown as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be found in both local and remote memory storage devices.

Alternatively, or in addition, the functionality described here can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating new versions of a universally unique user identifier (UUID), the method comprising:
    obtaining a UUID corresponding to a user identity, the UUID comprising a masked portion and a non-masked portion, the unmasked portion of the UUID being associated with a user identity in a network, the masked portion identifying a type of UUID;
    stripping away the masked portion of the UUID from the non-masked portion the UUID;
    selecting a set of one or more new masks to be applied to the UUID, the set of one or more new masks being associated with a corresponding set of rules for handling and processing the non-masked portion of the UUID;
    subsequent to stripping away the masked portion of the UUID, selectively generating a modified non-masked portion of the UUID by modifying the non-masked portion of the UUID with a particular modification process while refraining from applying the particular modification process to the masked portion of the UUID; and
    subsequent to selectively generating the modified non-masked portion of the UUID, composing a new version of the UUID by adding the set of one or more new masks to the modified non-masked portion of the UUID.

2. The method of claim 1, wherein the particular modification process comprises encrypting the non-masked portion of the UUID.

3. The method of claim 1, wherein the particular modification process comprises applying a transform to a string of characters comprising the non-masked portion of the UUID.

4. The method of claim 1, wherein said obtaining the UUID comprises generating the UUID.

5. The method of claim 1, wherein the method further comprises generating an additional new version of the UUID that is composed of a different set of one or more new masks and an encrypted version of the non-masked portion of the UUID that is encrypted with a different encryption used to generate the modified non-masked portion of the UUID.

6. The method of claim 1, wherein the set of one or more masks comprises a plurality of different masks that each correspond to a different set of rules for handling and processing the non-masked portion of the UUID.

7. The method of claim 1, wherein the set of one or more for handling and processing the non-masked portion of the UUID specifies how to decrypt the modified non-masked portion of the UUID.

8. The method of claim 1, wherein the set of one or more for handling and processing the non-masked portion of the UUID identifies a third-party system assigned to handle the UUID.

9. The method of claim 1, wherein the set of one or more for handling and processing the non-masked portion of the UUID specifies an authorization or restriction associated with a user account identified by the non-masked portion of the UUID.

10. The method of claim 1, wherein the UUID is a 64-bit XUID having a 48-bit non-masked portion.

11. A system for generating new versions of a unique user identifier (UID), the system comprising:
   a hardware processor; and
   one or more storage devices having stored instructions that are executable by the hardware processor for causing the system to implement a method comprising:
   accessing the UID corresponding to a user identity;
   selecting a mask to be applied to the UID, the mask corresponding to a partner system in a network and a corresponding set of rules for handling and processing a non-masked portion of the UID;
   encrypting the non-masked portion of a UID with an encryption key associated with the mask corresponding to the partner system;
   subsequent to encrypting the non-masked portion of the UID, composing a new version of the UID by adding the mask to a modified non-masked portion of the UID; and
   providing the new version of the UID to the partner system.

12. The system of claim 11, wherein the method further includes:
   identifying and stripping away an original mask from a masked portion of the UID prior to encrypting the non-masked portion of the UID.

13. The system of claim 11, wherein accessing the UID includes generating the UID.

14. The system of claim 11, wherein the method further comprises generating an additional new version of the UID that is composed of a different mask corresponding to a different partner system and an encrypted version of the non-masked portion of the UID that is encrypted with a different encryption key that is associated with the different partner system corresponding to the different mask.

15. The system of claim 11, wherein the UID is a 128-bit UID, wherein the non-masked portion of the UID comprises at least 48 bits of the UID.

* * * * *